(12) United States Patent
Lee

(10) Patent No.: US 11,079,967 B2
(45) Date of Patent: Aug. 3, 2021

(54) MEMORY SYSTEM, MEMORY CONTROLLER AND OPERATING METHOD OF MEMORY CONTROLLER

(71) Applicant: SK hynix Inc., Gyeonggi-do (KR)

(72) Inventor: Seok-Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 86 days.

(21) Appl. No.: 16/676,201

(22) Filed: Nov. 6, 2019

(65) Prior Publication Data

US 2020/0310692 A1    Oct. 1, 2020

(30) Foreign Application Priority Data

Apr. 1, 2019   (KR) ......................... 10-2019-0038088

(51) Int. Cl.
*G06F 3/06*   (2006.01)

(52) U.S. Cl.
CPC .......... *G06F 3/0659* (2013.01); *G06F 3/0608* (2013.01); *G06F 3/0629* (2013.01); *G06F 3/0673* (2013.01)

(58) Field of Classification Search
CPC .... G06F 3/0608; G06F 3/0629; G06F 3/0632; G06F 3/0658; G06F 3/0659; G06F 3/0673; G06F 3/0685
USPC ....... 711/103, 125, 129, 154, 170, 171, 172, 711/173
See application file for complete search history.

(56) References Cited

U.S. PATENT DOCUMENTS

| | | | |
|---|---|---|---|
| 2012/0317349 A1* | 12/2012 | Tonami | G06F 3/0611 711/103 |
| 2014/0082346 A1* | 3/2014 | Tao | G06F 9/4401 713/2 |
| 2016/0371101 A1* | 12/2016 | Beale | G06F 12/08 |
| 2016/0378511 A1* | 12/2016 | Jung | G06F 11/1417 713/2 |

FOREIGN PATENT DOCUMENTS

KR   10-2011-0050457   5/2011
KR   10-2011-0086759   7/2011

* cited by examiner

*Primary Examiner* — Gary J Portka
(74) *Attorney, Agent, or Firm* — IP & T Group LLP

(57) ABSTRACT

A memory system includes a memory device including memory blocks and a memory controller configured to control the memory device. The memory device stores a firmware which includes binaries, and the binaries include a first binary and a second binary. The memory controller loads the firmware to a first region in a working memory, loads the first binary to a second region which is included in the first region, and loads the second binary to a third region which is included in the first region and is different from the second region. The memory controller stores information on an entry function corresponding to a target function included in the second binary, in a fourth region which is different from the first region. A start address of the second region is determined as a fixed value, and a start address of the third region is dynamically determined.

18 Claims, 11 Drawing Sheets

MEMORY SYSTEM, MEMORY CONTROLLER AND OPERATING METHOD OF MEMORY CONTROLLER

CROSS-REFERENCE TO RELATED APPLICATION

The present application claims priority to Korean Patent Application No. 10-2019-0038088, filed in the Korean Intellectual Property Office on Apr. 1, 2019, which is incorporated herein by reference in its entirety.

BACKGROUND

1. Technical Field

Various embodiments generally relate to a memory system, a memory controller and an operating method of the memory controller.

2. Related Art

A memory system corresponding to a storage device stores data based on a request of a host, such as a computer, a mobile terminal such as a smartphone and a tablet, or any of various other electronic devices. The memory system may be of a type that stores data in a magnetic disk, such as a hard disk drive (HDD), or of a type that stores data in a nonvolatile memory, such as a solid state drive (SDD), a universal flash storage (UFS) device and an embedded MMC (eMMC) device.

The nonvolatile memory in the memory system may include any of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

The memory system may further include a memory controller for controlling a memory device. The memory controller may drive firmware for controlling general operations of the memory controller upon booting and performing logic calculations.

As functions of the memory controller are gradually becoming more diversified and complicated, the size of the firmware is increasing. Thus, the storage capacity of a memory used to load the firmware is also increasing, which increases the overall cost of the memory system.

SUMMARY

Various embodiments are directed to a memory system, a memory controller and an operating method thereof, capable of optimizing a size of a memory used to load a firmware.

Also, various embodiments are directed to a memory system, a memory controller and an operating method thereof, capable of minimizing the overall cost of the memory system.

In one aspect, a memory system to be described in embodiments of the disclosure may include a memory device including a plurality of memory blocks and a memory controller configured to control the memory device.

The memory device may store firmware which includes a plurality of binaries including a first binary and a second binary.

The memory controller may load the first binary to a second region which is included in a first region in a working memory, and may load the second binary to a third region which is included in the first region and is different from the second region.

The memory controller may store information on an entry function corresponding to a target function in the second binary, in a fourth region which is different from the first region.

A start address of the second region may be determined as a fixed value, and a start address of the third region may be dynamically determined.

The memory controller may load the second binary to the third region at a time when the target function is called.

An offset between the fourth region and the first region may be equal to or greater than a threshold offset.

The threshold offset may be set depending on bits used in a memory addressing scheme of the memory controller.

An address of the target function may be determined based on a compile time address of the target function, a compile time address of the second binary and a start address of the third region.

The memory controller may include a processor with a non-mapping based architecture for memory addresses.

The memory controller may set a logical memory address and a physical memory address to be the same.

The first binary may include at least one of a function for executing a read operation, a function for executing a program operation and a function for executing a map update operation.

The second binary may include at least one of a function for executing a booting operation and a function for executing a background operation.

The background operation may include at least one of a garbage collection (GC) operation, a wear leveling (WL) operation and a map flush operation.

In another aspect, a memory controller to be described in embodiments of the disclosure may include a host interface configured to communicate with a host; a memory interface configured to communicate with a memory device; and a control circuit configured to control the memory device.

The memory device may store firmware which includes a plurality of binaries including a first binary and a second binary.

The control circuit may load the first binary to a second region which is included in a first region in a working memory, and may load the second binary to a third region which is included in the first region and is different from the second region.

The control circuit may store information on an entry function corresponding to a target function in the second binary, in a fourth region which is different from the first region.

A start address of the second region may be determined as a fixed value, and a start address of the third region may be dynamically determined.

The memory controller may load the second binary to the third region at a time when the target function is called.

An offset between the fourth region and the first region may be equal to or greater than a threshold offset.

An address of the target function may be determined based on a compile time address of the target function, a compile time address of the second binary and a start address of the third region.

In still another aspect, a method for operating a memory controller for controlling a memory device, to be described in embodiments of the disclosure, may include loading a first binary among a plurality of binaries in firmware stored in the memory device, to a second region which is included in a first region in a working memory.

The method for operating a memory controller may include loading a second binary among the plurality of binaries included in the firmware, to a third region which is included in the first region and is different from the second region.

The method for operating a memory controller may include storing information on an entry function corresponding to a target function in the second binary, in a fourth region which is different from the first region.

A start address of the second region may be determined as a fixed value, and a start address of the third region may be dynamically determined.

The method for operating a memory controller may further include loading the second binary to the third region at a time when the target function is called.

An offset between the fourth region and the first region may be equal to or greater than a threshold offset.

An address of the target function may be determined based on a compile time address of the target function, a compile time address of the second binary and a start address of the third region.

In still another aspect, a memory system to be described in embodiments of the disclosure may include a memory device suitable for storing firmware which includes a plurality of binaries including a non-overlayable binary and an overlayable binary.

A memory system may further include a controller including a memory having a first region and a second region.

A controller may load the non-overlayable binary in the first region.

A controller may load the overlayable binary in the second region when a function corresponding to the overlayable binary is called.

Embodiments of the disclosure may provide a memory system, a memory controller and an operating method of the memory controller, capable of optimizing a size of a memory used to load a firmware.

Also, embodiments of the disclosure may provide a memory system, a memory controller and an operating method of the memory controller, capable of minimizing the overall cost of the memory system.

DETAILED DESCRIPTION

A memory system, a memory controller and an operating method of the memory controller are described below with reference to the accompanying drawings through various embodiments.

Figure 1:
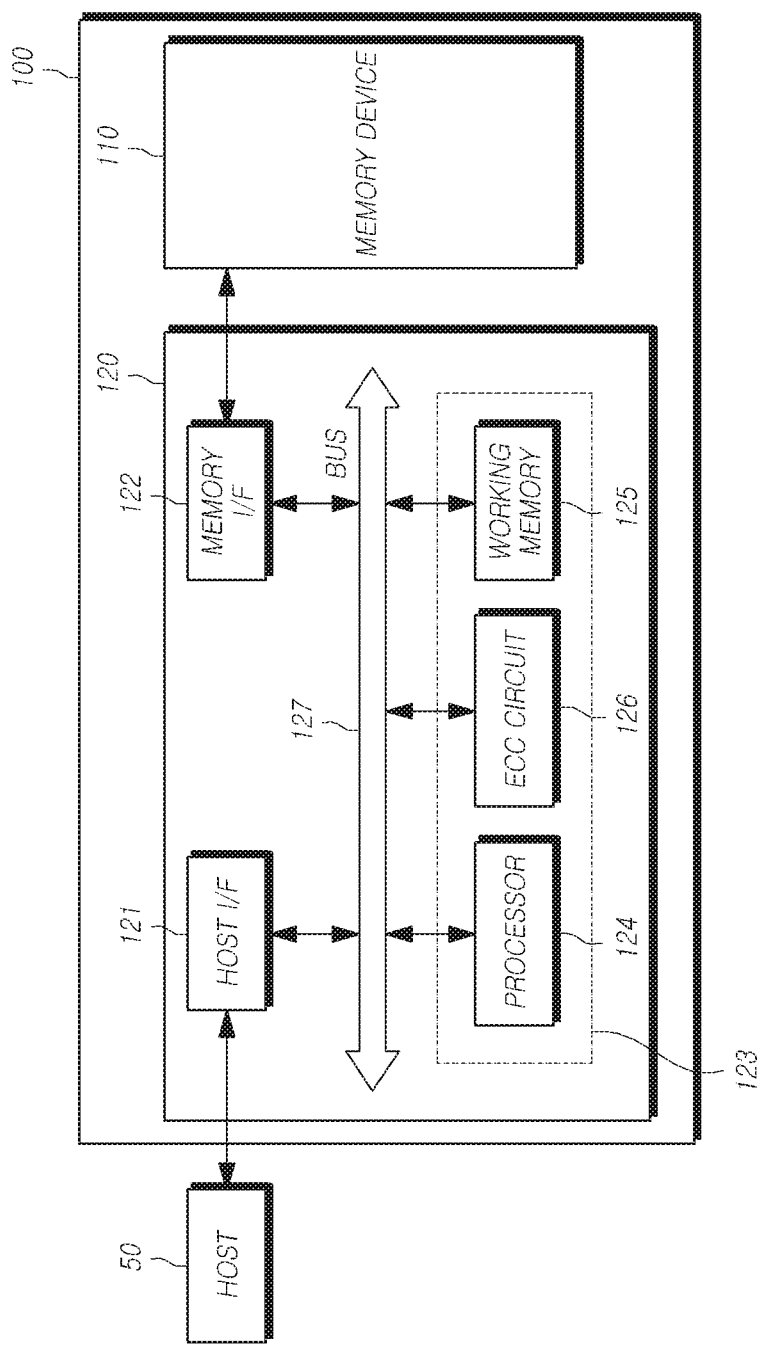
FIG. 1 is a block diagram schematically illustrating a memory system in accordance with an embodiment.

FIG. 1 is a block diagram schematically illustrating a memory system 100 in accordance with an embodiment.

Referring to FIG. 1, the memory system 100 may include a memory device 110 which stores data, and a memory controller 120 which controls the memory device 110.

The memory device 110 includes a plurality of memory blocks and operates in response to the control of the memory controller 120. Operations of the memory device 110 may include, for example, a read operation, a program operation (also referred to as a write operation) and an erase operation.

The memory device 110 may include a memory cell array including a plurality of memory cells which store data. Such a memory cell array may exist in a memory block.

For example, the memory device 110 may be realized by a double data rate (DDR) synchronous dynamic random access memory (SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may be realized in a three-dimensional array structure. The embodiments may be applied to not only a flash memory device in which a charge storage layer is configured by a conductive floating gate but also a charge trap flash (CTF) in which a charge storage layer is configured by a dielectric layer.

The memory device 110 is configured to receive a command and an address from the memory controller 120 and access a region in the memory cell array which is selected by the address. In other words, the memory device 110 may perform an operation corresponding to the command, for a region selected by the address.

For example, the memory device 110 may perform a program operation, a read operation and an erase operation. In this connection, in the program operation, the memory device 110 may program data in a region selected by the address. In the read operation, the memory device 110 may read data from a region selected by the address. In the erase operation, the memory device 110 may erase data stored in a region selected by the address.

The memory controller 120 may control the operation of the memory device 110 according to a request of a host 50 or regardless of a request of the host 50.

For example, the memory controller 120 may control write (or program), read, erase and background operations for the memory device 110. For example, the background operation may be a garbage collection (GC) operation, a wear leveling (WL) operation, a bad block management (BBM) operation, or the like.

The memory controller 120 may include a host interface (I/F) 121, a memory interface 122, and a control circuit 123.

The host interface 121 provides an interface for communication with the host 50. When receiving a command from the host 50, the control circuit 123 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface between the memory device 110 and the memory controller 120 in response to the control of the control circuit 123.

The control circuit 123 may perform the general control operations of the memory controller 120, thereby controlling the operations of the memory device 110. The control circuit 123 may include at least one of a processor 124, a working memory 125, and an error detection and correction (ECC) circuit 126.

The processor 124 may control general operations of the memory controller 120, and may perform a logic calculation. The processor 124 may communicate with the host 50 through the host interface 121, and may communicate with the memory device 110 through the memory interface 122.

The processor 124 may be designed using a specific architecture.

For instance, the processor 124 may be designed using an ARM Cortex-M architecture which is optimized to realize a micro controller unit (MCU).

The ARM Cortex-M architecture uses a 32-bit memory addressing scheme.

The ARM Cortex-M architecture may support ARM Thumb instructions, and may be extended to support both 16-bit and 32-bit instructions defined as a Thumb-2 instruction set.

In the ARM Cortex-M architecture, interrupt processing may be managed by a built-in interrupt controller called a nested vectored interrupt controller (NVIC). The built-in interrupt controller may perform the functions of automatic prioritization, nesting and masking of interrupts and system exceptions.

Further, the ARM Cortex-M architecture may support a memory protection unit (MPU) which is able to divisionally manage a memory space.

The ARM Cortex-M architecture is a non-mapping based architecture for memory addresses. The non-mapping based architecture does not use a memory management unit (MMU) which provides a mapping function between logical memory addresses and physical memory addresses. In the case where the memory management unit is not used, logical memory addresses and physical memory addresses may be set to be the same.

The processor 124 may perform the function of a flash translation layer (FTL). The processor 124 may translate a logical block address (LBA) provided by the host 50, into a physical block address (PBA), through the flash translation layer (FTL). The flash translation layer (FTL) may receive the logical block address (LBA) and translate it into the physical block address (PBA), by using a mapping table. There are various address mapping methods of the flash translation layer, depending on a mapping unit. Representative address mapping methods include a page mapping method, a block mapping method and a hybrid mapping method.

The processor 124 is configured to randomize data received from the host 50. For example, the processor 124 may randomize data received from the host, by using a randomizing seed. Randomized data as data to be stored is provided to the memory device 110 and is programmed to the memory cell array.

The processor 124 is configured to derandomize data received from the memory device 110, in a read operation. For example, the processor 124 may derandomize data received from the memory device 110, by using a derandomizing seed. Derandomized data may be outputted to the host 50.

The processor 124 may control the operation of the memory controller 120 by executing firmware (FW). In other words, in order to control general operations of the memory controller 120 and execute a logic calculation, the processor 124 may execute (or drive) firmware loaded to the working memory 125 upon booting. For instance, the firmware may be stored in the memory device 110 and be loaded to the working memory 125.

The firmware as a program executed in the memory system 100 may include, for example, a flash translation layer (FTL), a host interface layer (HIL), and a flash interface layer (FIL). The flash translation layer (FTL) performs a translation function between a logical address requested to the memory system 100 from the host 50 and a physical address of the memory device 110. The host interface layer (HIL) serves to analyze a command requested to the memory system 100 as a storage device from the host 50 and transfer the command to the flash translation layer (FTL). The flash interface layer (FIL) transfers a command instructed from the flash translation layer (FTL) to the memory device 110.

The working memory 125 may store firmware, program code, commands and data which are necessary to drive the memory controller 120.

The working memory 125, for example, as a volatile memory, may include at least one of a static RAM (SRAM), a dynamic RAM (DRAM) and a synchronous DRAM (SDRAM).

In the case where the processor 124 uses the ARM Cortex-M architecture, the working memory 125 may be a tightly coupled memory (TCM).

The error detection and correction circuit 126 may be configured to detect an error bit of data stored in the working memory 125 (that is, read data transferred from the memory device 110) by using an error correction code and correct the detected error bit.

The error detection and correction circuit 126 may be configured to decode data by using an error correction code. The error detection and correction circuit 126 may be realized by any of various code decoders. For example, a decoder which performs non-systematic code decoding or a decoder which performs systematic code decoding may be used.

For example, the error detection and correction circuit 126 may detect an error bit by the unit of sector for each read data. Namely, each read data may be constituted by a plurality of sectors. A sector may mean a data unit smaller than a page as a read unit of a flash memory. Sectors constituting each read data may be matched with one another by the medium of an address.

The error detection and correction circuit 126 may calculate a bit error rate (BER), and may determine whether an error is correctable or not, by the unit of sector. For example, in the case where a bit error rate (BER) is greater than a reference value, the error detection and correction circuit 126 may determine a corresponding sector as being uncorrectable or a fail. Conversely, in the case where a bit error rate (BER) is less than the reference value, the error detection and correction circuit 126 may determine a corresponding sector as being correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the memory controller 120. The bus 127 may include, for example, a control bus for transferring various control signals, commands and the likes, a data bus for transferring various data, and the like.

The configuration of components 121, 122, 124, 125 and 126 of the memory controller 120, as illustrated and described, is exemplary only. One or more of these components may be omitted and/or the functionality of one or more of these components may be combined into a single integrated component. Of course, the memory controller 120 may contain additional components not illustrated in FIG. 1.

The memory device 110 is described in further detail with reference to FIG. 2.

Figure 2:
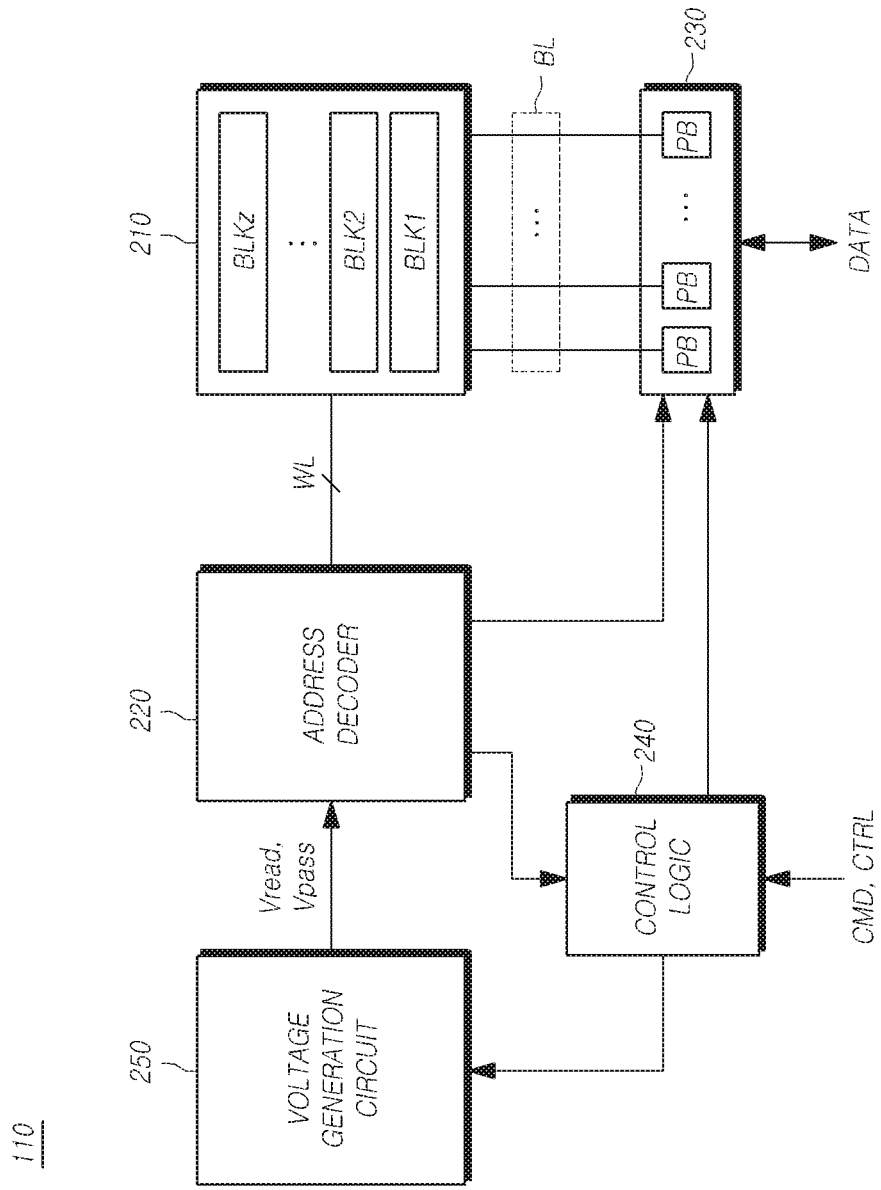
FIG. 2 is a block diagram schematically illustrating a memory device in accordance with an embodiment.

FIG. 2 is a block diagram schematically illustrating the memory device 110 in accordance with an embodiment.

Referring to FIG. 2, the memory device 110 may include a memory cell array 210, an address decoder 220, a read and write circuit 230, control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells which have vertical channel structures. The memory cell array 210 may be configured by a memory cell array of a two-dimensional structure, or a memory cell array of a three-dimensional structure.

Each of the plurality of memory cells in the memory cell array 210 may store at least 1-bit data. For instance, each of the plurality of memory cells in the memory cell array 210 may be a signal level cell (SLC) storing 1-bit data. For another instance, each of the plurality of memory cells in the memory cell array 210 may be a multi-level cell (MLC) which stores 2-bit data. For another instance, each of the plurality of memory cells in the memory cell array 210 may be a triple level cell (TLC) which stores 3-bit data. For another instance, each of the plurality of memory cells in the memory cell array 210 may be a quad level cell (QLC) which stores 4-bit data. For still another instance, the memory cell array 210 may include a plurality of memory cells each of which stores 5 or more-bit data.

The firmware described above with reference to FIG. 1 may be stored in at least one of the plurality of memory blocks described above. The structure of the firmware stored in the memory device 110 is described below in detail with reference to FIG. 3.

Referring to FIG. 2, the address decoder 220, the read and write circuit 230, the control logic 240 and the voltage generation circuit 250 may operate as peripheral circuits which drive the memory cell array 210.

The address decoder 220 may be coupled to the memory cell array 210 through the plurality of word lines WL. The address decoder 220 may be configured to operate in response to the control of the control logic 240. The address decoder 220 may receive an address through an input/output buffer in the memory device 110.

The address decoder 220 may be configured to decode a block address in the received address. The address decoder 220 may select at least one memory block depending on the decoded block address. During a read operation, the address decoder 220 may apply a read voltage Vread generated by the voltage generation circuit 250 to a selected word line, and may apply a pass voltage Vpass to the remaining unselected word lines. Further, during a program verify operation, the address decoder 220 may apply a verify voltage generated by the voltage generation circuit 250 to a selected word line, and may apply the pass voltage Vpass to the remaining unselected word lines.

The address decoder 220 may be configured to decode a column address in the received address. The address decoder 220 may transmit the decoded column address to the read and write circuit 230.

A read operation and a program operation of the memory device 110 may be performed by the unit of page. An address received when a read operation or a program operation is requested may include a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may include a page buffer circuit or a data register circuit. For example, the data register circuit may include a data buffer for performing a data processing function, and may further include a cache buffer for performing a caching function.

The plurality of page buffers PB may be coupled to the memory cell array 210 through the plurality of bit lines BL. The plurality of page buffers PB may continuously supply sensing current to bit lines coupled with memory cells to sense the threshold voltages (Vth) of the memory cells in a read operation and a program verify operation. Further, the plurality of page buffers PB may latch sensing data by sensing, through sensing nodes, that the amounts of current flowing depending on the programmed states of the corresponding memory cells are changed. The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. In an embodiment, the read and write circuit 230 may include a column select circuit in addition to the page buffers (or page registers).

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass in a read operation in response to a voltage generation circuit control signal outputted from the control logic 240.

Figure 3:
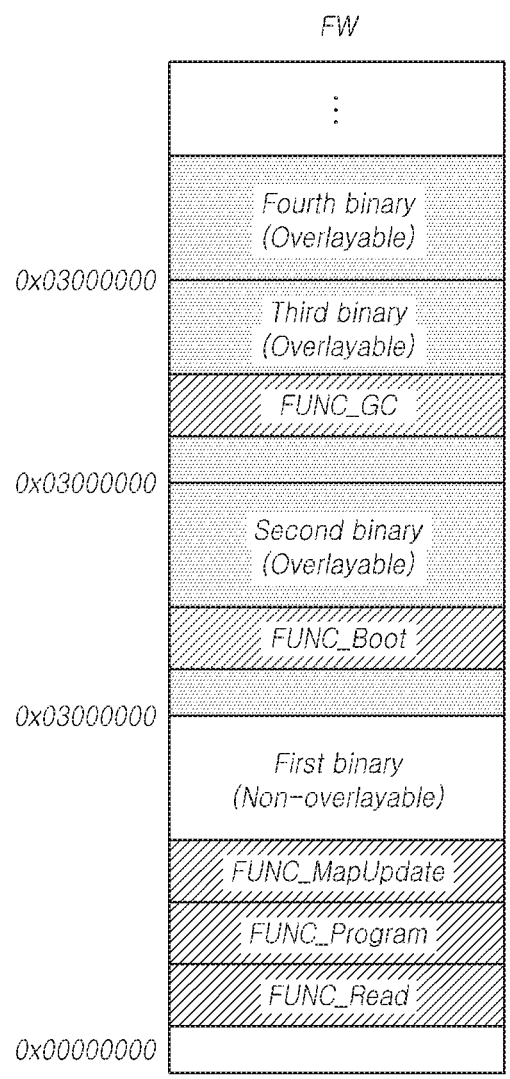
FIG. 3 is a diagram illustrating the structure of firmware in accordance with an embodiment.

FIG. 3 is a diagram illustrating firmware (FW) in accordance with an embodiment.

As described above with reference to FIG. 1, in order for the memory controller 120 to drive firmware, the firmware needs to be loaded to the working memory 125.

In order for the entire firmware to be loaded to the working memory 125, the storage capacity of the working memory 125 should be greater than or equal to the total size of the firmware. However, as the size of firmware increases, the cost of the working memory 125 also increases.

Therefore, as illustrated in FIG. 3, firmware may be configured to include a plurality of binaries. The memory controller 120 may load only some binaries to the working memory 125 among all of the binaries in the firmware. In this case, since the working memory 125 does not need to secure a storage capacity to accommodate the total size of the firmware to drive the firmware, the cost of the working memory 125 may be reduced.

That is to say, if only some of the plurality of binaries in the firmware are dynamically loaded to the working memory 125 at runtime, it is possible to efficiently use the working memory 125, thereby reducing cost of the working memory 125. This technique may be referred to as a runtime overlay technique.

There are two types of the runtime overlay technique: a static runtime overlay technique and a dynamic runtime overlay technique. In the static runtime overlay technique, a specific binary may be loaded to only a specific region of the working memory 125. On the other hand, in the dynamic runtime overlay technique, a binary may be loaded to all regions of the working memory 125.

When comparing the two runtime overlay techniques described above, the static runtime overlay technique has a concern in that a specific region of the working memory 125 needs to be reserved to operate a specific binary. Thus, when compared to the static runtime overlay technique, the dynamic runtime overlay technique has an advantage in that it is possible to efficiently use the working memory 125.

However, in the case where the dynamic runtime overlay technique is used, the physical memory address of a binary loaded to the working memory 125 may dynamically change. Thus, there is a need for a module which manages the change of the physical memory address corresponding to a function, which is included in the binary loaded to the working memory 125 and thereby manages the corresponding function so that it can be called normally.

Particularly, in the case where the ARM Cortex-M architecture is used in the processor 124 of the memory controller 120, since a memory management unit (MMU) is not used, logical memory addresses and physical memory addresses are set to be the same. Therefore, when the physical memory address of a binary loaded to the working memory 125 is dynamically changed, it is impossible to fix a logical memory address corresponding to the physical memory address.

Moreover, in the case where the ARM Cortex-M architecture is used, due to the optimization function of an ARM compiler, a relative position information based on a program counter (PC) is used when a function is called. Therefore, if the physical memory address of a binary loaded to the working memory 125 is changed, the call of a function may not be performed properly.

In addition, in the case where the dynamic runtime overlay technique is used, overhead may be incurred in the process of dynamically loading a binary in the firmware and in the process of calling a function of the loaded binary.

Hence, in order to minimize these concerns that are likely to occur due to the use of the dynamic runtime overlay technique, embodiments of the disclosure propose to use the dynamic runtime overlay technique only for some of the plurality of binaries in the firmware.

In other words, in embodiments of the disclosure, a binary including functions critical to the operation performance, among the plurality of binaries in the firmware, may be set as a non-overlayable binary. Whether or not a particular function is deemed critical may vary depending on system configuration.

The fact that a binary is non-overlayable means that the runtime overlay technique is not applied to the corresponding binary. A non-overlayable binary may always be in a state in which it is loaded to the working memory 125.

An example of a function critical to the operation performance may be a function that the memory controller 120 calls at a high frequency, such as a function for executing a read operation, a function for executing a program operation and a function for executing a map update operation.

On the other hand, a binary including functions not critical to the operation performance may be set as an overlayable binary.

The fact that a binary is overlayable means that the runtime overlay technique is applicable to the corresponding binary. An overlayable binary may be dynamically loaded to the working memory 125 at a runtime.

An example of a function not critical to the operation performance may be a function that the memory controller 120 calls at a low frequency, such as a function for executing a booting operation and a function for executing a background operation (e.g., a garbage collection (GC) operation, a wear leveling (WL) operation and a map flush operation).

For instance, as shown in FIG. 3, among the plurality of binaries in the firmware, a first binary may be a non-overlayable binary, and a second binary, a third binary and a fourth binary may be overlayable binaries.

As described above, a function critical to the operation performance may be included in the first binary which is non-overlayable. For instance, a function FUNC_Read for executing a read operation, a function FUNC_Program for executing a program operation and a function FUNC_MapUpdate for executing a map update operation may be included in the first binary.

On the other hand, a function not critical to the operation performance may be included in one of the second binary, the third binary and the fourth binary which are overlayable. For instance, a function FUNC_Boot for executing a booting operation may be included in the second binary, and a function FUNC_GC for executing a garbage collection operation may be included in the third binary.

For each of the plurality of binaries in the firmware, a start address corresponding to each binary may be determined when such binary is compiled. This may be referred to as a compile time address for each binary.

Also, even for each function in each binary, a start address corresponding to each function may be determined when such function is compiled. This may be referred to as a compile time address for each function.

For example, a compile time address of the first binary may be determined as 0x00000000 at a time when the first binary is compiled. Compile time addresses of the second binary, the third binary and the fourth binary may be determined as 0x03000000 at times when the second binary, the third binary and the fourth binary are compiled.

As described above for example, the values of compile time addresses of the second binary, the third binary and the fourth binary may be determined to be the same. The reason for this is because the second binary, the third binary and the fourth binary are overlayable binaries and addresses at which the overlayable binaries are loaded to the working memory 125 are dynamically determined, and the overlayable binaries do not overlap in the working memory 125.

With reference to FIGS. 4 to 9, a case where, among the binaries in the firmware, the non-overlayable first binary and the overlayable second binary are loaded to the working memory 125 of the memory controller 120 is described as an example.

Figure 4:
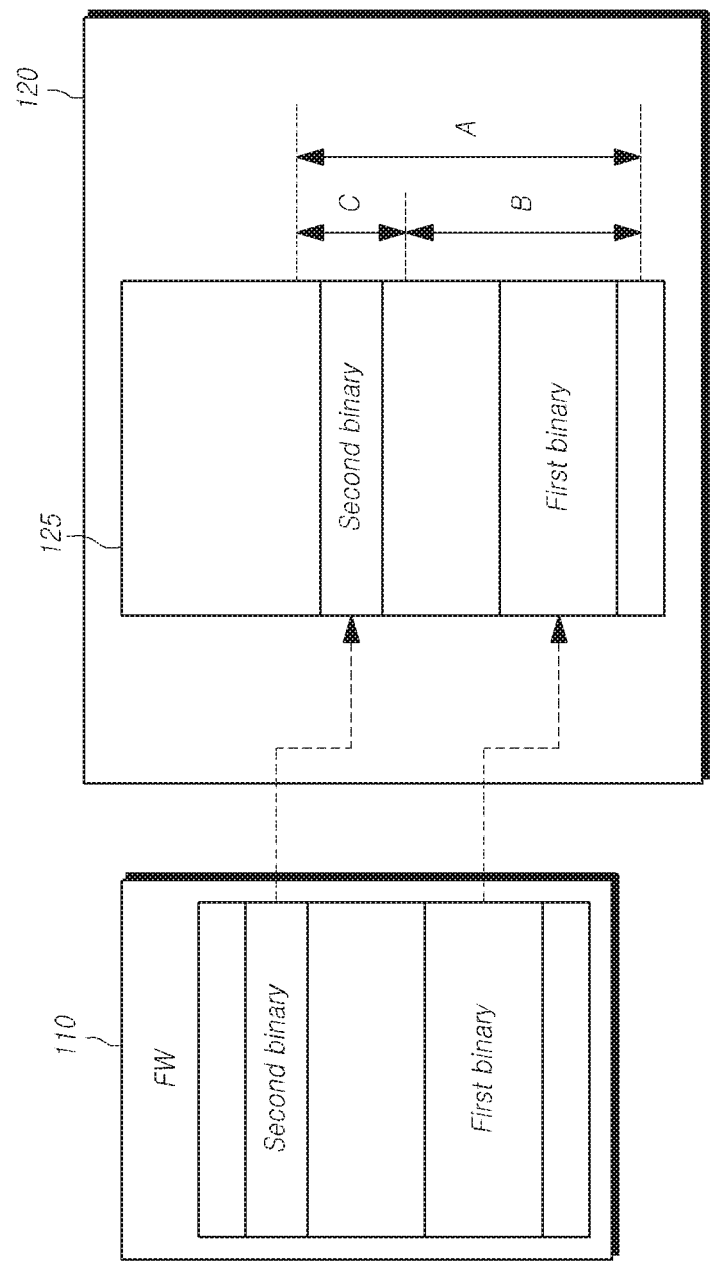
FIG. 4 is a diagram illustrating an operation for a memory controller to load some binaries in the firmware stored in the memory device, in accordance with an embodiment.

FIG. 4 is a diagram illustrating an operation for the memory controller 120 to load some of binaries in the firmware stored in the memory device 110, in accordance with an embodiment.

Referring to FIG. 4, the firmware stored in the memory device 110 may be loaded to a first region A in the working memory 125 of the memory controller 120. The first region A is a region allocated to load the firmware, and a binary in the firmware may be loaded to a part in the first region A.

The first region A to which the firmware is loaded may include a second region B and a third region C. The second region B is a region to which a non-overlayable binary is to be loaded, and a start address of the second region B may be determined as a fixed value.

On the other hand, unlike the second region B, the third region C is a region to which an overlayable binary is to be loaded, and a start address of the third region C may be dynamically determined.

Regarding a time when a start address of the third region C is dynamically determined, for instance, a start address of the third region C may be dynamically determined at a time when an overlayable binary is loaded to the third region C.

For another instance, a start address of the third region C may be dynamically determined before a time when an overlayable binary is loaded to the third region C.

In FIG. 4, since the first binary is a non-overlayable binary, it may be loaded to the second region B. On the other hand, since the second binary is an overlayable binary, it may be loaded to the third region C.

Figure 5:
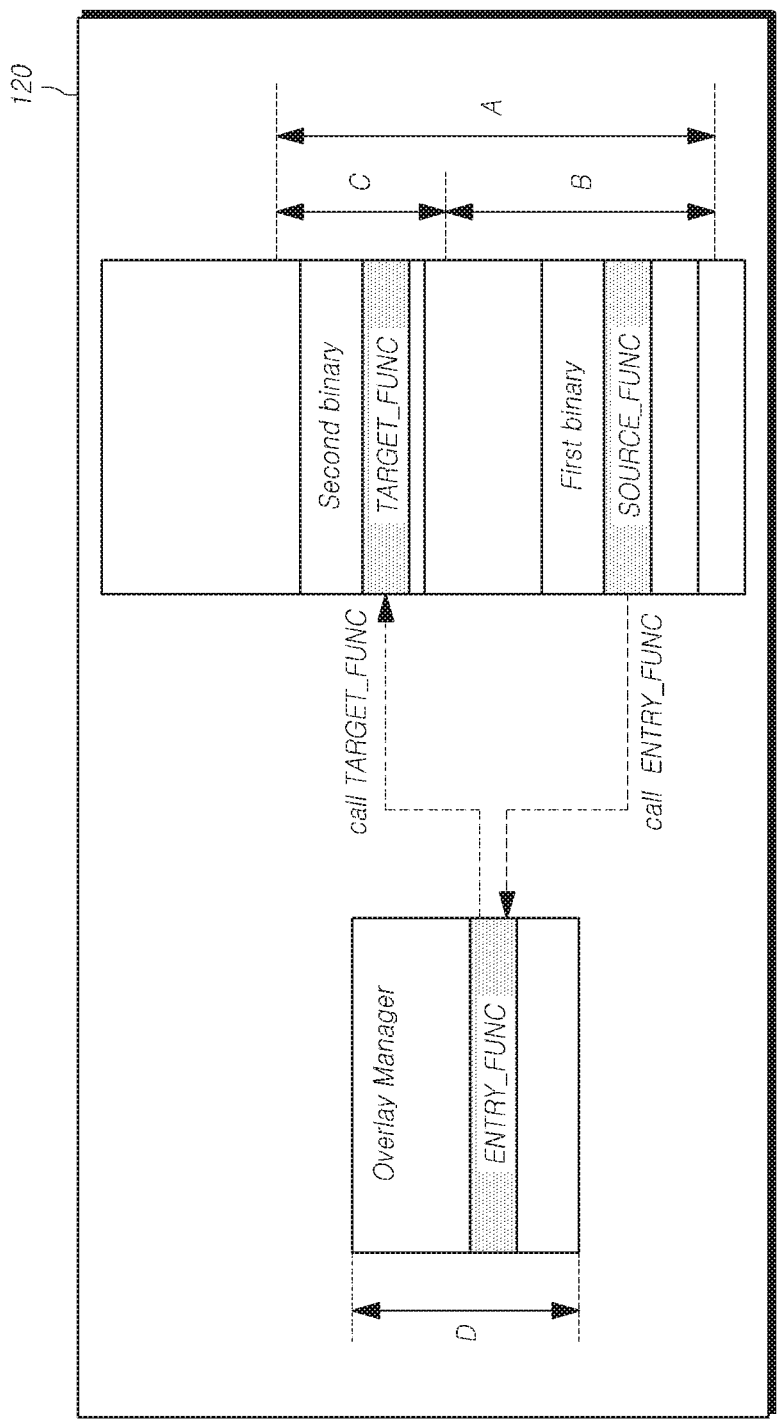
FIG. 5 is a diagram illustrating an operation for a memory controller to execute a target function included in a second binary, in accordance with an embodiment.

FIG. 5 is a diagram illustrating an operation for the memory controller 120 to execute a target function in a second binary, in accordance with an embodiment.

An operation in which, with the first binary loaded to the second region B and the second binary loaded to the third region C, a source function SOURCE_FUNC in the first binary calls a target function TARGET_FUNC in the second binary is described as an example.

However, it is to be noted that a source function which calls a target function in the second binary is not necessarily included in the first binary. A source function may be included in the second binary, or may be included in another overlayable binary other than the second binary.

As described above with reference to FIG. 4, when the second binary is loaded to the third region C, a start address of the third region C is dynamically determined at a time when the second binary is loaded. Therefore, an address of the target function TARGET_FUNC in the second binary is also dynamically determined at a time when the second binary is loaded to the third region C. Thus, since the source function SOURCE_FUNC cannot know an address of the target function TARGET_FUNC in advance, the source function SOURCE_FUNC cannot directly call the target function TARGET_FUNC.

Thus, the source function SOURCE_FUNC calls an entry function ENTRY_FUNC corresponding to the target function TARGET_FUNC, and thereby, calls the target function TARGET_FUNC corresponding to the entry function ENTRY_FUNC. A function in the first binary may call a corresponding entry function based on an absolute address information of the corresponding entry function.

Since a target function corresponding to an entry function is included in the second binary, an address of the target function may dynamically change. Hence, a module which dynamically manages a correspondence relationship between an entry function and a target function is needed. Such a module may be referred to as an overlay manager.

With respect to a target function in the second binary, the overlay manager may store information on an entry function corresponding to the target function.

The information on the entry function may be stored in a fourth region D which is different from the first region A.

Regarding a position of the fourth region D, the fourth region D may be included in the working memory 125 in which the first region A is included. For example, in the case where the working memory 125 is a tightly coupled memory (TCM), the first region A may be included in an instruction TCM (ITCM), and the fourth region D may be included in a data TCM (DTCM).

On the other hand, the fourth region D may be included in a separate working memory different from the working memory 125 in which the first region A is included.

When the source function SOURCE_FUNC calls the entry function ENTRY_FUNC stored in the fourth region D, the overlay manager may control the target function TARGET_FUNC corresponding to the called entry function ENTRY_FUNC to be called.

FIG. 5 illustrates the operation of the memory controller 120 in a state in which the second binary including the target function TARGET_FUNC is loaded to the third region C in the working memory 125.

However, the second binary is dynamically loaded to the working memory 125. Therefore, when the source function SOURCE_FUNC calls the entry function ENTRY_FUNC stored in the fourth region D, the second binary may be in a state in which it is not loaded to the working memory 125.

In this case, an operation of loading the second binary to the working memory 125 to allow the target function TARGET_FUNC in the second binary to be called is described below in detail with reference to FIG. 6.

Figure 6:
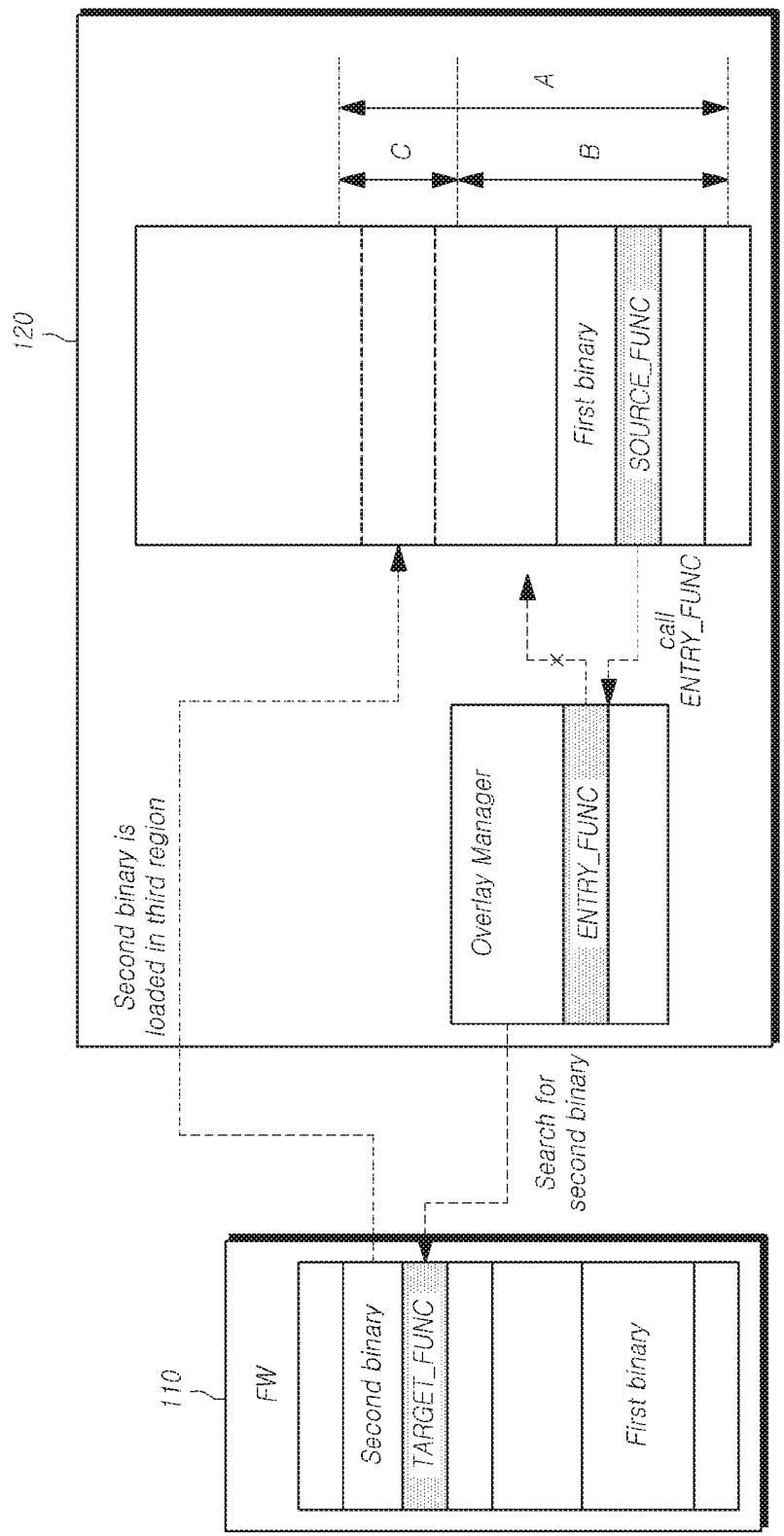
FIG. 6 is a diagram illustrating an operation for a memory controller to load a binary included in the firmware to execute a target function, in accordance with an embodiment.

FIG. 6 is a diagram illustrating an operation for the memory controller 120 to load a binary in the firmware to execute a target function, in accordance with an embodiment.

Referring to FIG. 6, first, the source function SOURCE_FUNC in the first binary calls the entry function ENTRY_FUNC in the fourth region D.

The overlay manager checks that the target function TARGET_FUNC corresponding to the entry function ENTRY_FUNC is in a state in which it is not currently loaded to the working memory 125.

The overlay manager searches for the second binary in which the target function TARGET_FUNC is stored, in the firmware stored in the memory device 110. The overlay manager may load the second binary to the third region C in the first region A of the working memory 125. If the second binary is loaded to the third region C, the target function TARGET_FUNC may be called thereafter.

Figure 7:
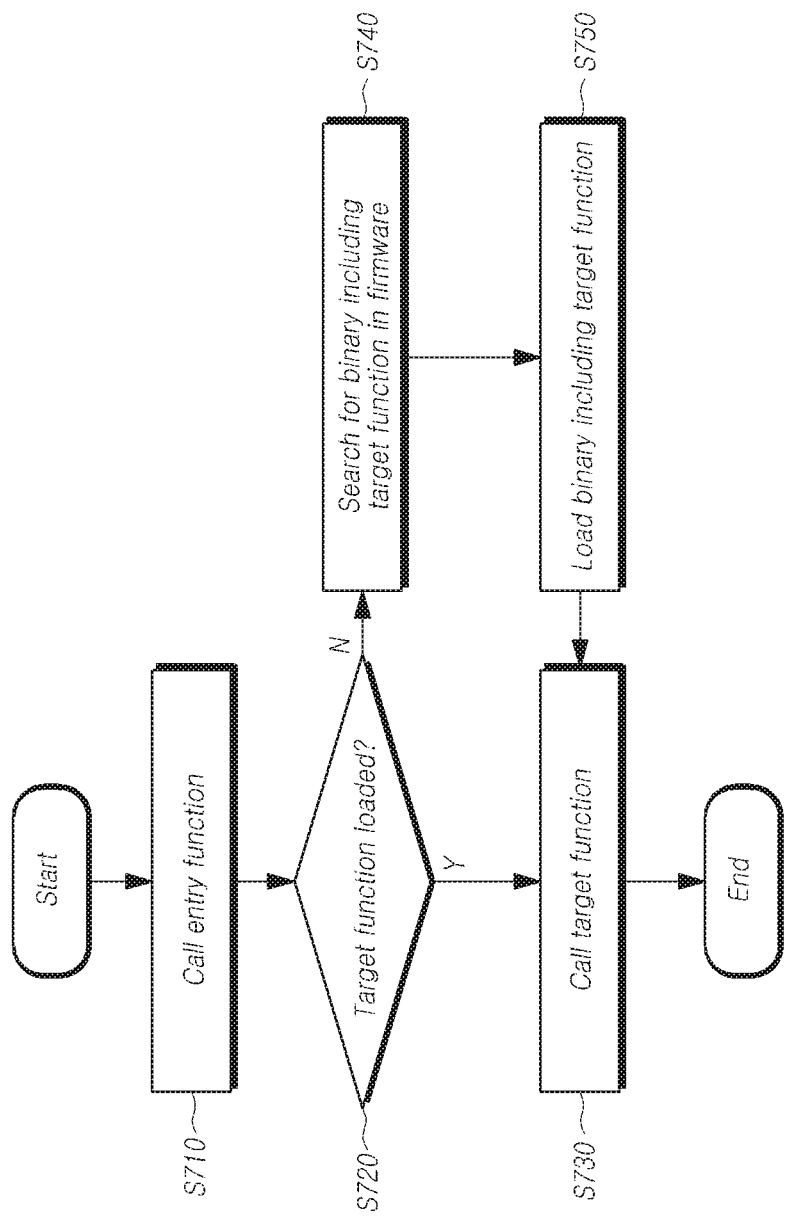
FIG. 7 is a flow chart illustrating an operating method for a memory controller to call a target function, in accordance with an embodiment.

FIG. 7 is a flow chart illustrating an operating method for the memory controller 120 to call a target function, in accordance with an embodiment.

An example in which the memory controller 120 calls a target function according to the operations described above with reference to FIGS. 5 and 6 is described.

Referring to FIG. 7, first, an entry function corresponding to the target function is called (S710). As described above, a source function in the first binary loaded to the working memory 125 of the memory controller 120 may call the entry function corresponding to the target function.

If the entry function is called at the step S710, the overlay manager determines whether the target function corresponding to the entry function is loaded to the working memory 125 (S720).

In the case where it is determined that the target function is loaded to the working memory 125 (S720, Y), the overlay manager calls the target function corresponding to the entry function (S730).

In the case where it is determined that the target function is not loaded to the working memory 125 (S720, N), the overlay manager searches for a binary in which the target function corresponding to the entry function is included (S740).

If the binary in which the target function is included is found in the search, the overlay manager loads such binary to the working memory 125 (S750). Thereafter, the overlay manager calls the target function corresponding to the entry function (S730).

The flow chart of FIG. 7 described above may also be expressed by the following pseudo code, for example.

```
VOID HANDLE_TARGETFUNC(ENTRY_FUNC entryFunc)
{
    CALL_ENTRYFUNC(entryFunc)
    TARGET_FUNC targetFunc =
```

-continued

```
    GET_TARGETFUNC(entryFunc)
    IF( IS_TARGETFUNC_LOADED(targetFunc) == TRUE)
        CALL_TARGETFUNC(targetFunc)
    ELSE
    {
    FW_BINARY fwBinary = SEARCH_BINARY(targetFunc)
    LOAD_BINARY(fwBinary)
    CALL_TARGETFUNC(targetFunc)
    }
}
```

A correspondence relationship among a binary in the firmware, a binary loaded to the working memory 125 and the overlay manager is described with reference to FIGS. 8 and 9.

Figure 8:
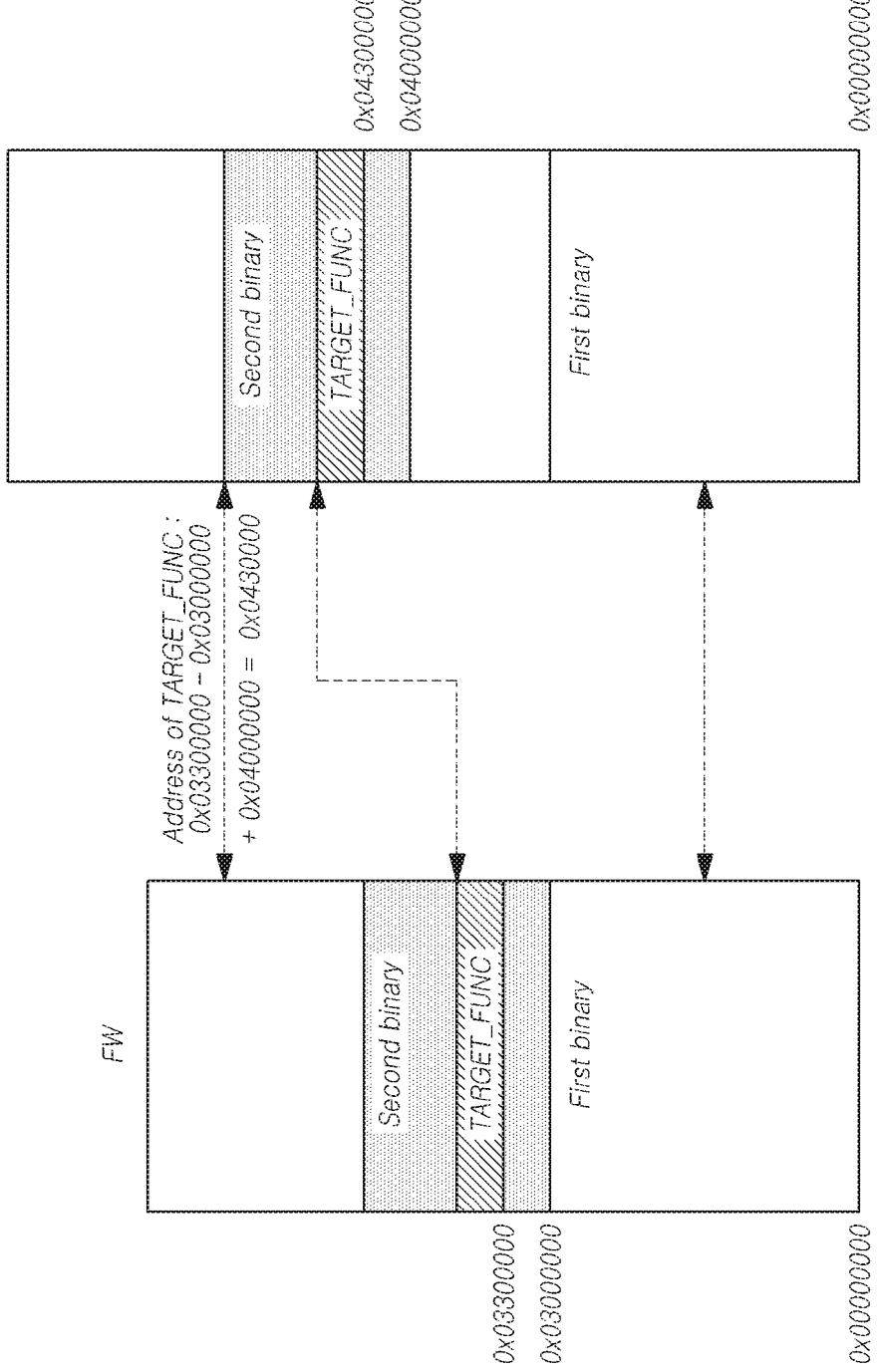
FIG. 8 is a diagram illustrating an example of a correspondence relationship between a binary in firmware and a binary loaded to a working memory of a memory controller in accordance with an embodiment.

FIG. 8 is a diagram illustrating an example of a correspondence relationship between a binary in the firmware and a binary loaded to the working memory 125 of the memory controller 120 in accordance with an embodiment.

In a process in which the firmware is compiled, a compile time address for each of a plurality of binaries in the firmware may be determined. Also, a compile time address of each function in each binary may be determined.

Referring to FIG. 8, a compile time address of the first binary is 0x00000000. A start address of a region to which the first binary is loaded in the working memory 125 may be determined as 0x00000000 as a fixed value.

In other words, the compile time address of the first binary and the start address of the region to which the first binary is loaded may be determined to be the same.

On the other hand, since a start address of a region to which the second binary is loaded in the working memory 125 is dynamically determined, a compile time address of the second binary and a start address of a region to which the second binary is loaded may be determined to be different from each other.

In FIG. 8, a compile time address of the second binary is 0x03000000, but a start address of a region to which the second binary is loaded in the working memory 125 is different as 0x04000000.

Further, an address of the target function TARGET_FUNC in the second binary loaded to the working memory 125 is different from a compile time address of the target function TARGET_FUNC. The address of the target function TARGET_FUNC in the second binary loaded to the working memory 125 may be determined based on the compile time address of the target function TARGET_FUNC, the compile time address of the second binary and the start address of the region to which the second binary is loaded in the working memory 125.

In detail, when the second binary is loaded to the working memory 125, each of addresses of functions in the second binary has a difference corresponding to an offset between the compile time address of the second binary and the start address of the region to which the second binary is loaded in the working memory 125. Therefore, the address of the target function TARGET_FUNC may be determined as a value obtained by applying the corresponding offset to the compile time address of the target function TARGET_FUNC.

For instance, in FIG. 8, it is assumed that the compile time address of the target function TARGET_FUNC is 0x03300000, the compile time address of the second binary is 0x03000000 and the start address of the region to which the second binary is loaded in the working memory 125 is 0x04000000. In this case, the address of the target function TARGET_FUNC loaded to the working memory 125 is determined as (0x03300000−0x03000000+0x04000000) 0x04300000.

The operation of determining the address of the target function TARGET_FUNC in FIG. 8 may also be expressed by the following pseudo code, for example.

```
ADDR GET_TARGETADDR(TARGET_FUNC targetFunc)
{
    FW_BINARY fwBinary = SEARCH_BINARY(targetFunc)
    ADDR targetFuncAddr =
        GET_COMPILE_TIME_ ADDR(targetFunc)
    ADDR binaryAddr = GET_COMPILE_TIME_ADDR(fwBinary)
    ADDR loadedAddr = GET_LOADED_ADDR(fwBinary)
    return (targetFuncAddr − binaryAddr + loadedAddr)
}
```

Figure 9:
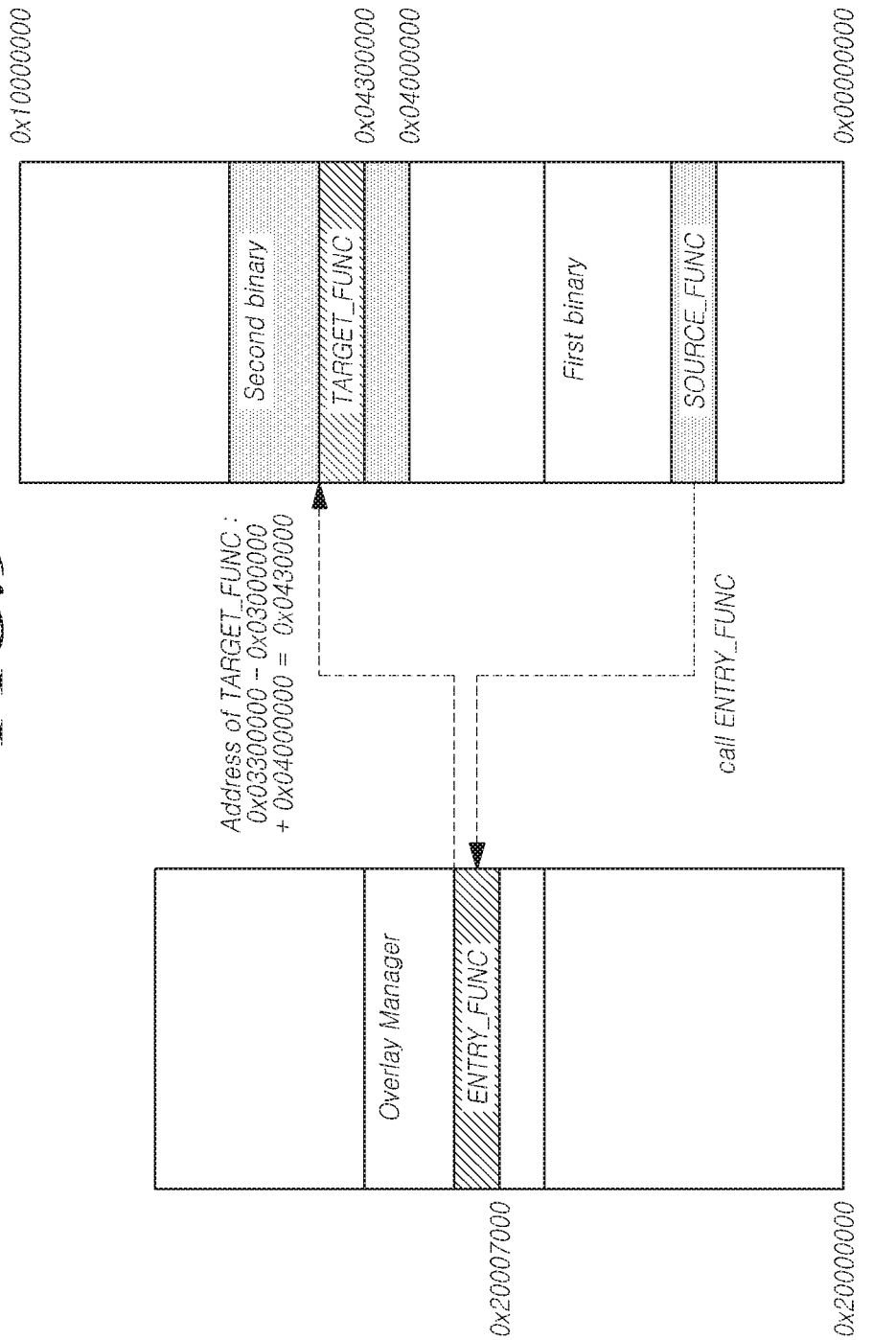
FIG. 9 is a diagram illustrating an example of a correspondence relationship between a binary loaded to a working memory of a memory controller and an overlay manager in accordance with an embodiment.

FIG. 9 is a diagram illustrating a correspondence relationship between a binary loaded to the working memory 125 of the memory controller 120 and the overlay manager in accordance with an embodiment.

A case where, similarly to FIG. 8, a compile time address of the second binary is 0x03000000 but a start address of a region to which the second binary is loaded in the working memory 125 is 0x04000000 is described as an example.

In order to execute the target function TARGET_FUNC in the second binary, the source function SOURCE_FUNC in the first binary calls first the entry function ENTRY_FUNC corresponding to the target function TARGET_FUNC. In order for the source function SOURCE_FUNC to call the corresponding entry function ENTRY_FUNC, the source function SOURCE_FUNC needs to be able to access an absolute address of the corresponding entry function ENTRY_FUNC regardless of a position of the source function SOURCE_FUNC.

To this end, by limiting a region in which the corresponding entry function ENTRY_FUNC is stored, it is possible to allow the source function SOURCE_FUNC to access the absolute address of the corresponding entry function ENTRY_FUNC, regardless of a position where the first binary is loaded.

For instance, an offset between the region in which the corresponding entry function ENTRY_FUNC is stored and a region to which the firmware is loaded may be set to be greater than or equal to a threshold offset, which may be preset. The threshold offset may be set depending on bits used in the memory addressing scheme of the memory controller 120.

A case where the memory controller 120 includes a processor which is designed by using an ARM Cortex-M architecture is described as an example. As aforementioned, the ARM Cortex-M architecture as a non-mapping based architecture for memory addresses does not use a memory management unit.

As described above with reference to FIG. 1, the ARM Cortex-M architecture uses the 32-bit memory addressing scheme. Namely, in the case where the processor 124 in the memory controller 120 is designed with the ARM Cortex-M architecture, bits used in the memory addressing scheme of the memory controller 120 are 32 bits.

When the processor 124 designed with the ARM Cortex-M architecture calls a function, functions with offsets within 32 MB from a current program counter (PC) may be branched. However, in the case where a processor is designed with an architecture different from the ARM Cortex-M architecture, a branchable offset may be set to be different from 32 MB.

In the case where a function which has an offset greater than or equal to 32 MB based on a current program counter is called, the ARM Cortex-M architecture supports jumping to an absolute address of the corresponding function, by using a veneer function.

Therefore, in the case where the memory controller 120 includes the processor 124 which uses the ARM Cortex-M architecture, if an offset between a region where an entry function is stored and a region to which the firmware is loaded is greater than or equal to the threshold offset (i.e., 32 MB), a source function may access an absolute address of the entry function.

Referring to FIG. 9, a region to which the firmware is loaded is set from 0x00000000 to 0x10000000 in the working memory 125, and a region where the entry function ENTRY_FUNC is stored starts from 0x20000000.

An offset between the region where the entry function ENTRY_FUNC is stored and the region to which the firmware is loaded is 0x10000000=256 MB that is greater than or equal to a threshold offset Thr_Offset of 32 MB. Thus, when the source function SOURCE_FUNC calls the entry function ENTRY_FUNC, the source function SOURCE_FUNC may call the entry function ENTRY_FUNC by using an absolute address 0x20007000 of the entry function ENTRY_FUNC.

If the entry function ENTRY_FUNC is called, the overlay manager may call the target function TARGET_FUNC corresponding to the called entry function ENTRY_FUNC.

In this case, as described above with reference to FIG. 8, an address of the target function TARGET_FUNC in the second binary loaded to the working memory 125 is different from a compile time address of the target function TARGET_FUNC. Thus, an address 0x04300000 of the target function TARGET_FUNC in the second binary loaded to the working memory 125 may be determined based on a compile time address 0x03300000 of the target function TARGET_FUNC, a compile time address 0x03000000 of the second binary and a start address 0x04000000 of the region to which the second binary is loaded in the working memory 125.

Figure 10:
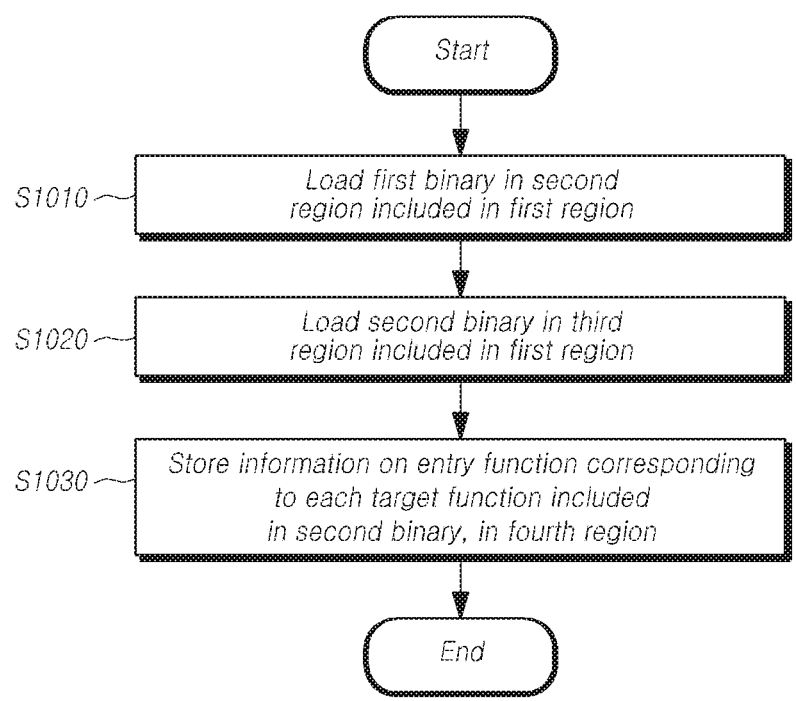
FIG. 10 is a flow chart illustrating a method for operating a memory controller in accordance with an embodiment.

FIG. 10 is a flow chart illustrating a method for operating the memory controller 120 in accordance with an embodiment.

Referring to FIG. 10, the method for operating the memory controller 120 for controlling the memory device 110 may include loading a first binary among a plurality of binaries in the firmware stored in the memory device 110, to a second region which is included in a first region in the working memory 125 (S1010).

The method for operating the memory controller 120 for controlling the memory device 110 may include loading a second binary among the plurality of binaries in the firmware stored in the memory device 110, to a third region which is included in the first region and is different from the second region (S1020).

The method for operating the memory controller 120 for controlling the memory device 110 may include storing information on an entry function corresponding to each target function in the second binary, in a fourth region which is different from the first region (S1030).

The memory controller 120 may include the working memory 125, and the working memory 125 may include the first region.

A start address of the second region may be determined as a fixed value, and a start address of the third region may be dynamically determined. A time when a start address of the third region is determined may be, for example, a time when the second binary is loaded to the third region. For another example, a time when a start address of the third region is determined may be before a time when the second binary is loaded to the third region.

The method for operating the memory controller 120 for controlling the memory device 110 may further include loading the second binary to the third region in the case where the second binary is not loaded to the third region at a time when the target function is called.

Figure 11:
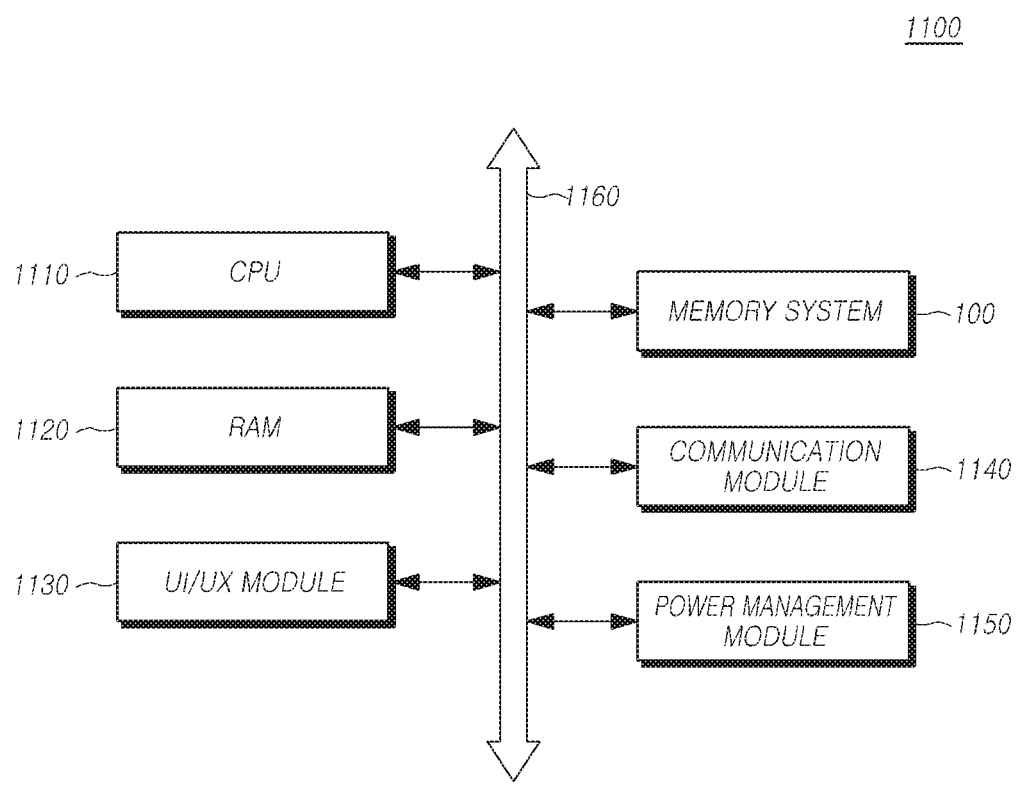
FIG. 11 is a block diagram schematically illustrating a computing system in accordance with an embodiment.

FIG. 11 is a block diagram schematically illustrating a computing system 1100 in accordance with an embodiment.

Referring to FIG. 11, the computing system 1100 may include a memory system 100, a central processing unit (CPU) 1110, a random access memory (RAM) 1120, a user interface/user experience (UI/UX) module 1130, a communication module 1140 based on at least one communication scheme and a power management module 1150 which are electrically coupled to a system bus 1160.

The computing system 1100 may be a personal computer (PC), or include a mobile terminal such as a smartphone and a tablet or any of various other electronic devices.

The computing system 1100 may further include a battery for supplying an operating voltage, and may further include an application chipset, a graphic-related module, a camera image processor (CIS), a DRAM and so forth. As those skilled in the art recognize, the computing system 1100 may include other components.

The memory system 100 may be of type that stores data in a magnetic disk, such as a hard disk drive (HDD), or of a type that stores data in a nonvolatile memory, such as a solid state drive (SDD), a universal flash storage (UFS) device and an embedded MMC (eMMC) device.

The nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

In addition, the memory system 100 may be realized as any of various types of storage devices, and/or may be mounted in any of various electronic devices. For instance, the memory system 100 may be mounted to an Internet of things (IoT) device or a small-sized home appliance which needs to minimize the use amount of a memory.

Through the above-described embodiments of the disclosure, a memory system, a memory controller and an operating method of the memory controller, capable of optimizing a size of a memory used to load a firmware, may be provided.

Also, embodiments of the disclosure may provide a memory system, a memory controller and an operating method of the memory controller, capable of minimizing the overall cost of the memory system.

Although various embodiments have been illustrated and described, those skilled in the art will appreciate in light of the present disclosure that various modifications, additions and substitutions are possible, without departing from the scope and spirit of the disclosure. Therefore, the disclosed embodiments should be considered in a descriptive sense only and not for limiting the scope of the invention. The scope of the invention is defined by the claims and their equivalents.

What is claimed is:

1. A memory system comprising:
a memory device including a plurality of memory blocks; and
a memory controller configured to control the memory device,
wherein the memory device stores firmware which includes a plurality of binaries including a first binary and a second binary,
wherein the memory controller loads the first binary to a second region which is included in a first region in a working memory, loads the second binary to a third region which is included in the first region and is different from the second region, and stores information on an entry function, corresponding to a target function in the second binary, in a fourth region which is different from the first region, and
wherein a start address of the second region is determined as a fixed value, and a start address of the third region is dynamically determined.

2. The memory system of claim 1, wherein the memory controller loads the second binary to the third region at a time when the target function is called.

3. The memory system of claim 1, wherein an offset between the fourth region and the first region is greater than or equal to a threshold offset.

4. The memory system of claim 3, wherein the threshold offset is set depending on bits used in a memory addressing scheme of the memory controller.

5. The memory system of claim 1, wherein an address of the target function is determined based on a compile time address of the target function, a compile time address of the second binary and a start address of the third region.

6. The memory system of claim 1, wherein the memory controller includes a processor with a non-mapping based architecture for memory addresses.

7. The memory system of claim 1, wherein the memory controller sets a logical memory address and a physical memory address to be the same.

8. The memory system of claim 1, wherein the first binary includes at least one of a function for executing a read operation, a function for executing a program operation and a function for executing a map update operation.

9. The memory system of claim 1, wherein the second binary includes at least one of a function for executing a booting operation and a function for executing a background operation.

10. The memory system of claim 9, wherein the background operation includes at least one of a garbage collection (GC) operation, a wear leveling (WL) operation and a map flush operation.

11. A memory controller comprising:
a host interface configured to communicate with a host;
a memory interface configured to communicate with a memory device; and
a control circuit configured to control the memory device,
wherein the memory device stores firmware which includes a plurality of binaries including a first binary and a second binary,
wherein the control circuit loads the first binary to a second region which is included in a first region in a working memory, loads the second binary to a third region which is included in the first region and is different from the second region, and stores information on an entry function, corresponding to a target function in the second binary, in a fourth region which is different from the first region, and
wherein a start address of the second region is determined as a fixed value, and a start address of the third region is dynamically determined.

12. The memory controller of claim 11, wherein the second binary is loaded to the third region at a time when the target function is called.

13. The memory controller of claim 11, wherein an offset between the fourth region and the first region is greater than or equal to a threshold offset.

14. The memory controller of claim 11, wherein an address of the target function is determined based on a compile time address of the target function, a compile time address of the second binary and a start address of the third region.

15. A method for operating a memory controller for controlling a memory device, comprising:
- loading a first binary, among a plurality of binaries in firmware stored in the memory device, to a second region which is included in a first region in a working memory;
- loading a second binary, among the plurality of binaries in the firmware, to a third region which is included in the first region and is different from the second region; and
- storing information on an entry function, corresponding to a target function in the second binary, in a fourth region which is different from the first region,
- wherein a start address of the second region is determined as a fixed value, and a start address of the third region is dynamically determined.

16. The method of claim 15, wherein:
- the second binary is loaded to the third region at a time when the target function is called.

17. The method of claim 15, wherein an offset between the fourth region and the first region is greater than or equal to a threshold offset.

18. The method of claim 15, wherein an address of the target function is determined based on a compile time address of the target function, a compile time address of the second binary and a start address of the third region.

* * * * *